United States Patent
Yong et al.

(10) Patent No.: US 9,825,856 B2
(45) Date of Patent: Nov. 21, 2017

(54) SERVICE FUNCTION CHAINING IN A PACKET NETWORK

(71) Applicant: Futurewei Technologies, Inc., Plano, TX (US)

(72) Inventors: Lucy Yong, Georgetown, TX (US); Linda Dunbar, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 240 days.

(21) Appl. No.: 14/584,932

(22) Filed: Dec. 29, 2014

(65) Prior Publication Data

US 2015/0195197 A1 Jul. 9, 2015

Related U.S. Application Data

(60) Provisional application No. 61/924,085, filed on Jan. 6, 2014.

(51) Int. Cl.
*H04L 12/741* (2013.01)
*H04L 12/721* (2013.01)
*H04L 12/715* (2013.01)

(52) U.S. Cl.
CPC ............ *H04L 45/74* (2013.01); *H04L 45/38* (2013.01); *H04L 45/64* (2013.01); *H04L 2212/00* (2013.01)

(58) Field of Classification Search
None
See application file for complete search history.

(56) References Cited

U.S. PATENT DOCUMENTS

| | | | |
|---|---|---|---|
| 2013/0163594 A1* | 6/2013 | Sharma | H04L 45/64 370/392 |
| 2013/0272305 A1* | 10/2013 | Lefebvre | H04L 47/24 370/392 |
| 2013/0287022 A1* | 10/2013 | Banavalikar | H04L 45/00 370/389 |
| 2014/0334295 A1* | 11/2014 | Guichard | H04L 47/2441 370/230 |
| 2014/0334488 A1* | 11/2014 | Guichard | H04L 45/306 370/392 |

(Continued)

OTHER PUBLICATIONS

Quinn et al., "Service Function Chaining (SFC) Architecture", Sep. 23, 2013, IETF.*

(Continued)

*Primary Examiner* — Peter Chau
(74) *Attorney, Agent, or Firm* — Slater Matsil, LLP

(57) ABSTRACT

Service function chaining is a sequence of service function instances that traffic flows need to traverse through in order. Those service function instances are not required to reside on the direct path and traffic flow, but steered through network nodes. Service function instances and network nodes process the packets that carry a service function chain (SFC) header. The packets are encapsulated by a virtual network overlay header and forwarded through the service function instances in an SFC. The SFC header in specific format will prompt the network nodes to re-route the packets in the traffic flow using destination based forwarding or path based forwarding method in the packet network as well as an SDN controller and/or in-band control plane, and able to carry the metadata with the packets.

19 Claims, 11 Drawing Sheets

(56) References Cited

U.S. PATENT DOCUMENTS

| | | | | |
|---|---|---|---|---|
| 2014/0362857 A1* | 12/2014 | Guichard | ............ | H04L 45/566 370/392 |
| 2015/0003455 A1* | 1/2015 | Haddad | .................. | H04L 45/38 370/392 |
| 2015/0026362 A1* | 1/2015 | Guichard | ................ | H04L 45/30 709/242 |
| 2015/0071285 A1* | 3/2015 | Kumar | .................. | H04L 45/306 370/392 |
| 2015/0085870 A1* | 3/2015 | Narasimha | ............ | H04L 49/70 370/409 |
| 2015/0103827 A1* | 4/2015 | Quinn | .................... | H04L 45/74 370/392 |
| 2015/0124815 A1* | 5/2015 | Beliveau | ............ | H04L 45/7453 370/392 |
| 2015/0138973 A1* | 5/2015 | Kumar | .................. | H04L 45/12 370/235 |
| 2016/0344611 A1* | 11/2016 | Ivars | ...................... | H04L 45/38 |

OTHER PUBLICATIONS

Quinn et al., "Network Service Header", Jul. 12, 2013, IETF.*
Quinn et al., "Service Function Chaining (SFC) Architecture", Oct. 21, 2013, IETF.*
Boucadair et al., "Service Function Chaining: Framework & Architecture", Oct. 3, 2013, IETF.*
Beliveau, "Service Function Chaining Architecture", Oct. 16, 2013, IETF.*
Boucadair et al., "Differentiated Service Function Chaining Framework", Aug. 21, 2013, IETF.*
Boucadair et al., "Differentiated Service Function Chaining Framework", Aug. 30, 2013, IETF.*
Agarwal, P., et al., "Generic Protocol Extension for VXLAN," Network Working Group, Internet Draft, Dec. 16, 2013, 15 pgs.
Lasserre, M., et al., "Framework for DC Network Virtualization," Internet Engineering Task Force, Internet Draft, Jul. 9, 2012, 22 pgs.
Mahalingam, M., et al., "VXLAN: A Framework for Overlaying Virtualized Layer 2 Networks over Layer 3 Networks," Network Working Group, Internet Draft, May 8, 2013, 22 pgs.
Quinn, P., et al., "Service Function Chaining (SFC) Architecture," Network Working Group, Internet Draft, Oct. 4, 2013, 18 pgs.
Quinn, P., et al., "Network Service Header," Network Working Group, Internet Draft, Oct. 7, 2013, 19 pgs.
Quinn, P., et al., "Service Function Chaining Problem Statement," Network Working Group, Internet Draft, Oct. 19, 2013, 19 pgs.
Sridharan, M., et al., "NVGRE: Network Virtualization using Generic Routing Encapsulation," Network Working Group, Internet Draft, Jul. 9, 2012, 17 pgs.
Worster, T., et al., "Encapsulation MPLS in IP or Generic Routing Encapsulation (GRE)," Network Working Group, RFC: 4023, Mar. 2005, 14 pgs.

* cited by examiner

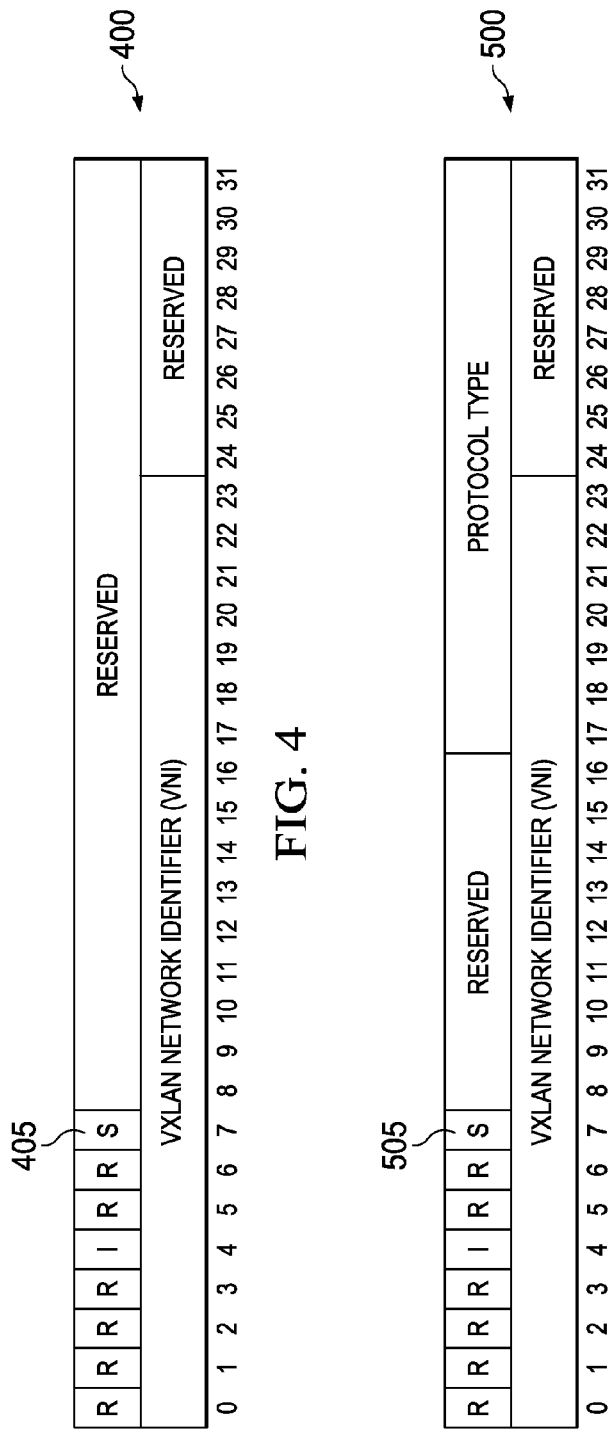

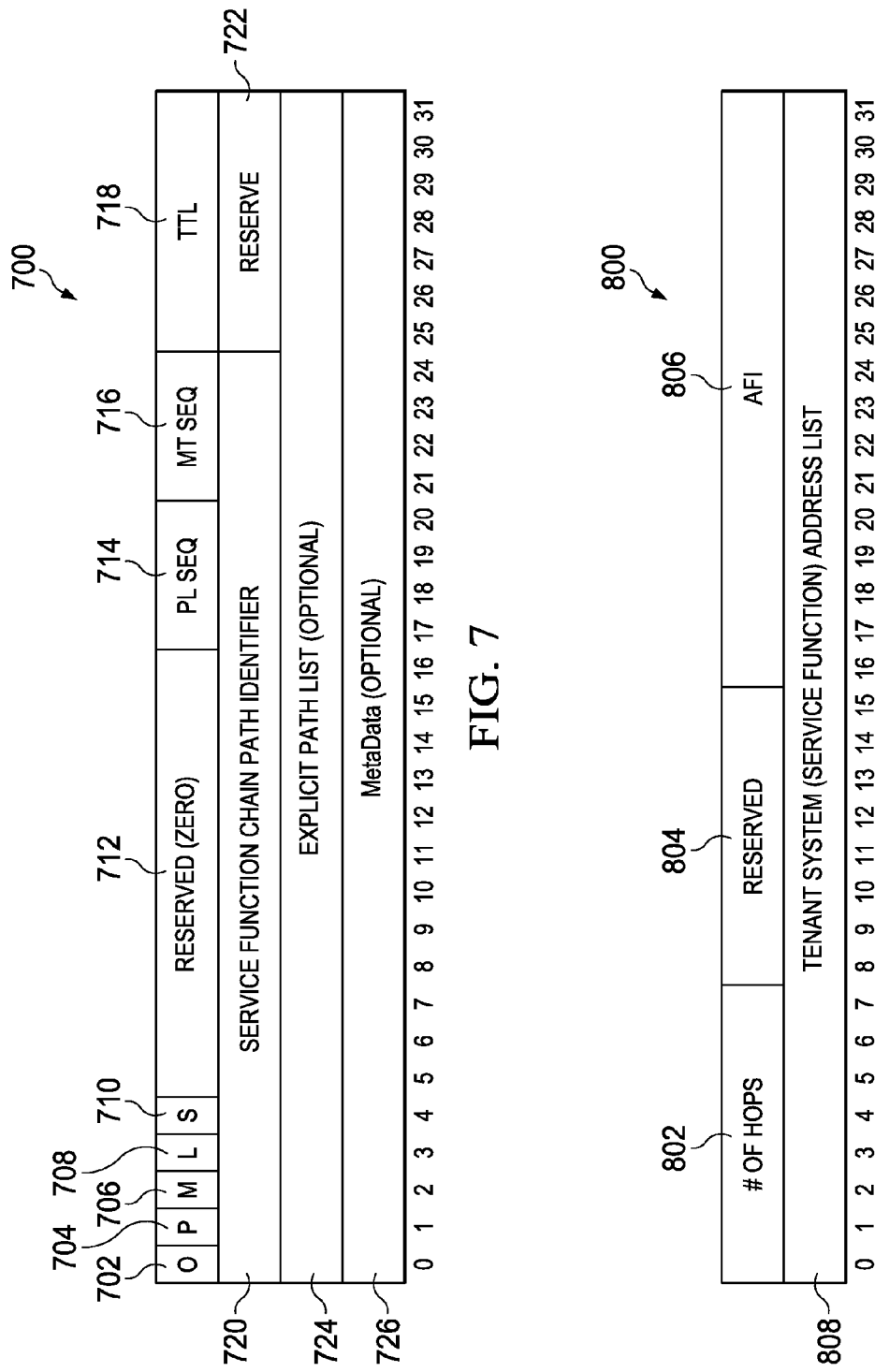

SERVICE FUNCTION CHAINING IN A PACKET NETWORK

This patent application claims priority to U.S. Provisional Application No. 61/924,085, filed on Jan. 6, 2014 and entitled "Service Function Chain Implementation in a Packet Network," which is hereby incorporated by reference herein as if reproduced in its entirety.

TECHNICAL FIELD

The present invention relates to a system and method for network communications, and, in particular embodiments, to a system and method for service function chaining in a packet network.

BACKGROUND

A service chain includes a sequence of service function instances that reside on various network nodes. When a traffic flow is forwarded over a service chain, packets in the traffic flow are processed by the various service function instances, with each service function instance applying a service function (e.g., firewall, network access translation (NAT), deep packet inspection (DPI), etc.) prior to forwarding the packets to the next network node. In some implementations, a service function instance may need to inspect certain fields on packets of a traffic flow to perform the function, or to determine whether the function needs to be performed on the traffic flow. As one example, a service function instance performing firewall processing may determine that a flow is benign based on the packets received. As another example, a service function instance performing DPI processing may need to inspect packets of a traffic flow to extract the identification information. As yet another example, a service function instance performing content delivery network (CDN) caching may learn that content in a traffic flow does not satisfy a caching criteria, at which point there is no processing (e.g., caching) to be performed on the packets. A service function chaining generally applies a sequence of service functions to a traffic flow in a specific order and layer 4-7 service functions are inserted on a data-forwarding path between communicating peers in common deployment model. Those service functions typically are placed in centralized location, for example next to a data center gateway, through which all traffic traverses.

SUMMARY OF INVENTION

Technical advantages are generally achieved, by embodiments of this disclosure which describe for service function chain implementation in a packet network.

In accordance with an embodiment, a method for service function chaining is provided. In this example, the method includes receiving an incoming overlay virtual network encapsulated frame that associates to a service function chain (SFC). The network node is positioned between an upstream service function instance and a downstream service function instance in the SFC. The method further comprises determining the downstream service function instance for the incoming overlay virtual network encapsulated frame. The downstream service function instance is either on the network node or on a next network node in accordance with an SFC header in the incoming overlay virtual network encapsulated frame. The method further comprises forwarding an outgoing overlay virtual network encapsulated frame including the SFC header to the downstream service function instance or a next network node. An apparatus for performing this method is also provided.

In accordance with another embodiment, another method for packet generating is provided. In this example, the method includes determining a next network node of an incoming overlay virtual network encapsulated frame. The next network node has a next service function instance in an SFC. The method further comprises configuring a flag indicating a presence of an SFC header in an overlay header in a packet of the incoming overlay virtual network encapsulated frame and generating an outgoing overlay virtual network encapsulated frame. The outgoing overlay virtual network encapsulated frame includes a tenant system frame, the SFC header, the overlay header, an outer underlay header, and an outer link layer header. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which:

FIG. 4 illustrates an embodiment virtual extensible local area network (VXLAN) header;

FIG. 5 illustrates an embodiment VXLAN+ header;

FIG. 6 illustrates an embodiment generic routing encapsulation (GRE) header;

FIG. 7 illustrates an embodiment SFC header;

FIG. 8 illustrates an embodiment SFC path list;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
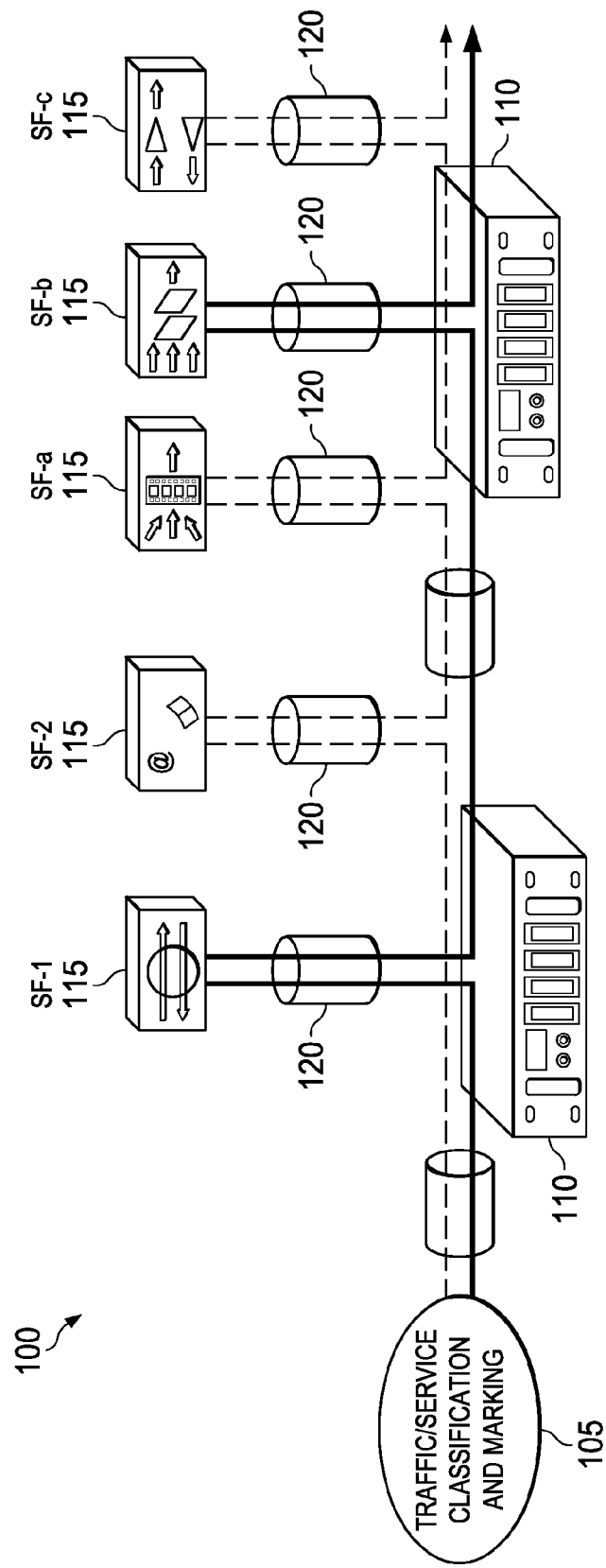
FIG. 1 illustrates a service chain architecture.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In conventional service chain architectures, packets of a traffic flow are forwarded to each service function instance via a service steering node on the service chain. For example, packets of a traffic flow in a service chain may sequentially traverse network elements (e.g., service chain classifier nodes, service switching/steering nodes, service functions, and path segments). Accordingly, techniques for one way transportation of information may be needed to reduce processing latency and increase the overall processing efficiencies of service chain networks.

Aspects of this disclosure provide techniques for one way transportation of information using a new service function chain (SFC) header embedded into an overlay virtual network encapsulated frame in order to reduce processing latency and increase processing efficiencies on a data plane between network nodes. A service chain classifier node classifies traffic flows and determines which service function chain applies to individual flows, then insert SFC headers on the packets and filled proper information on the SFC header, then forward the encapsulated packets toward next service steering node. The information on the SFC header and configured information on service steering nodes may ensure the packets passing each service functions in the SFC identified by the SFC path ID. A special service function identifier and/or service function information may be associated with packets of a traffic flow when the traffic flow is classified to designated destination (e.g., network node) where the packets are being forwarded by a service chain classifier. Thereafter, subsequent service steering nodes may easily steer the traffic flow to designated service function instances and the next service steering node. This one way transportation allows that some service function chains may include some metadata as well as a new SFC header which may be associated with the traffic flow, and enables network nodes to perform both packet routing/forwarding and path based forwarding using the new SFC header. As service chaining technology evolve, there may be a need to move to a model where service functions, whether physical or virtualized, are not required to reside on the direct data path, and traffic instead is steered through required service functions, wherever they are deployed. In an embodiment, the one way transportation using the new SFC header may also be achieved through a software defined network (SDN) controller or control plane procedures in another path segment. These and other aspects are discussed in greater detail below.

FIG. 1 illustrates a service chain architecture. As shown, the service chain architecture 100 includes a traffic/service classification and marking 105 (e.g., service classifier node), service steering nodes 110, service functions (SFs) 115, and path segments 120. A data plane service chain in the service chain architecture 100 begins at an ingress service classifier 105 and extends through service steering nodes 110 and various SFs 115. As shown, the service classifier 105 may determine that an oncoming traffic flow is associated with the data plane SFs 115. The SFs 115 may be components of a service function forwarding plane that are responsible for returning packets of a traffic flow back to the service steering nodes on the data plane. The service steering nodes 110 perform re-routing/branching of a traffic flow to the next-hop service function instance or another service steering node. When the traffic flow is classified to associate with a special SFC path that contains a set of service function identifier and/or service function information which may be associated with the packets of the traffic flow, subsequent service steering nodes 110 may easily steer the traffic flow to its designated destination. The path segments 120 are used for traversing existing network elements that are not aware of service chaining.

Figure 2:
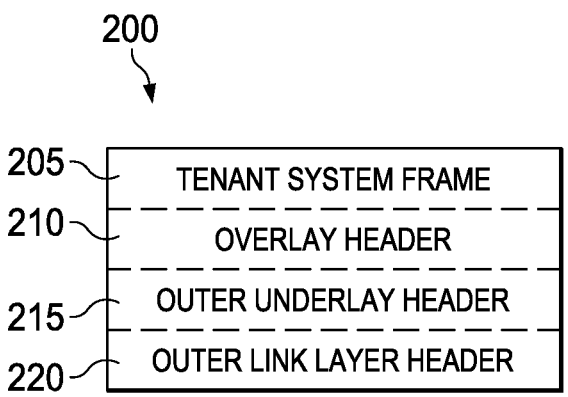
FIG. 2 illustrates an overlay virtual network encapsulated frame.

FIG. 2 illustrates a generic overlay virtual network encapsulated frame defined in network virtualization over layer 3 (NVO3). As shown the overlay virtual network encapsulated frame 200 includes a tenant system frame 205, an overlay header 210, an outer underlay header 215, and an outer link layer header 220 for the specific networks or link protocols requiring packet encapsulations and translations.

Aspects of this disclosure provide a data plane mechanism for one way transportation allowing a network virtual instance to support different data plane encapsulations and automatically discover a gateway performing data plane encapsulation translation by using a control plane protocol.

Figure 3:
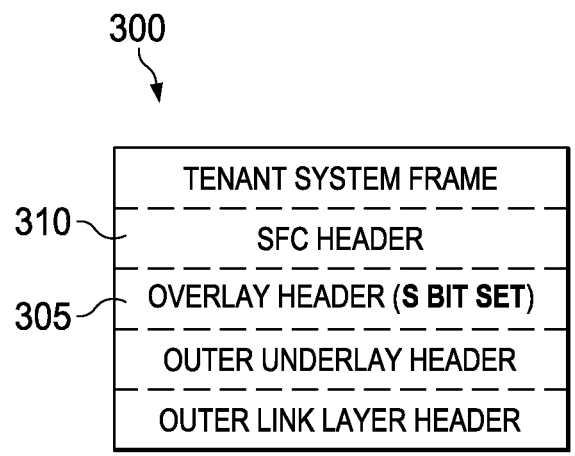
FIG. 3 illustrates an embodiment overlay virtual network encapsulated frame with a service function chain (SFC) header.

FIG. 3 illustrates an embodiment overlay virtual network encapsulated frame with a service function chain (SFC) header. As shown, the overlay virtual network encapsulated frame 300 includes an SFC header 310, an overlay header with an S bit 305, and various conventional headers for the specific networks and link protocols. The overlay header 305 may include the S bit for an embedded SFC header 310 addition in the overlay virtual network encapsulated frame 300. When the S bit embedded in the overlay header 305 is set (active high or low), the SFC header 310 is embedded after the overlay header 305.

Aspects of this disclosure provide any virtualized network as an overlay network in a packet network. More specifically, forwarding or re-routing of a traffic flow in an SFC may be achieved with some overlay network protocols or network tunneling protocols.

FIG. 4 illustrates an embodiment virtual extensible local area network (VXLAN) header with an S bit. As shown, the VXLAN header 400 includes an S bit 405 and various conventional header components (e.g., a group of reserved bits, a VXLAN ID). When the S bit placed on the $7^{th}$ bit position of a group of reservation bits is set, an SFC header is embedded after an overlay network header (e.g., the VXLAN header 400).

FIG. 5 illustrates an embodiment virtual extensible local area network plus (VXLAN+) header with an S bit. As shown, the VXLAN+ header 500 includes an S bit 505 and various conventional header components (e.g., a group of reserved bits, a protocol type, and a VXLAN network identifier (VNI)). When the S bit 505 placed on the $7^{th}$ bit position of a group of reservation bits is set, an SFC header is embedded after an overlay network header (e.g., the VXLAN+ header 500).

FIG. 6 illustrates an embodiment generic routing encapsulation (GRE) header with an S bit. As shown, the GRE header 600 includes an S bit 605 and various conventional header components (e.g., a group of reserved bits, a protocol type, and a virtual subnet (VSID)). When the S bit 605 placed on the $7^{th}$ bit position of a group of reservation bits is set, an SFC header is embedded after an overlay network header (e.g., the GRE header 600). In an embodiment, the GRE header 600 may be used in a multiprotocol label switching in-GRE (MPLS-in-GRE) encapsulation, where an MPLS label and the GRE header 600 together serves as an overlay header.

While FIG. 4-FIG. 6 have been described with an S bit which is placed on the $7^{th}$ bit position in a group of reservation bits, this description is not intended to be a constructed in a limiting sense. For example, any other bit, alternatively, may be used to indicate the presence of a SFC header carried with an overlay header.

Aspects of this disclosure provide an SFC header for forwarding or re-routing of a traffic flow, which may be implemented with any virtualized network as an overlay network in a packet network.

FIG. 7 illustrates an embodiment SFC header 700 to enable network nodes to perform both packet forwarding and routing. As shown, the SFC header 700 includes a group of unit bits 702-710, a group of reserved bits 712, 722, a packet list sequence (PL Seq.) 714, a metadata sequence (MT Seq.) 716, a time-to-live (TTL) 718, an SFC path identifier (ID) 720, an optional explicit path list 724, and optional metadata 726. The group of unit bits 702-710 further includes an O bit 702, a P bit 704, an M bit 706, an L bit 708, and an S bit 710. The O bit 702 is set to indicate that this packet is an operations and management (OAM) packet. The P bit 704 is set to indicate the optional explicit path list 724 presence. The M bit 706 is set to indicate the optional metadata 726 presence. The L bit 708 is set to indicate the PL Seq. 714 presence which is used to correlate the explicit path list information 724 carried by an overlay virtual network encapsulated frame.

A set of followed frames on the same SFC path with the value of PL Seq. 714 uses the same explicit path list information 724 without carrying the information on the frames. The S bit 710 is set to indicate the MT Seq. 716 presence which is used to correlate the metadata information 726. The metadata 726 is carried in one frame with a value in the MT Seq. 716. Other frames in the same SFC path use the same metadata information 726 with the same value in the MT Seq. 716 without carrying the metadata. The TTL 718 indicates a total number of service function instances on the SFC header 700 and the explicit path list 724. When a network node puts the explicit path list 724 on packets of a traffic flow, the network node may set the P bit 704 with a sequence number in the PL Seq. 714. If the next packets include the same SFC path ID 720, the network node may not insert the explicit path list 724 again but set the L bit 708 for inserting the same sequence number in the PL Seq. 714.

In an embodiment, service steering nodes may apply the same explicit path list to packets as well. In some embodiments, a classifier node may change an explicit path list as if necessary. When applying a different explicit path list on the same SFC path ID 720, a service classifier node resets the P bit 704 and the L bit 708, and encodes a new explicit path list 724 in the SFC header 700 with a different explicit path list sequence number in the PL Seq. 714. The explicit path list 724 contains a set of function instance addresses in the order of top-down, where the top entry on the explicit path list represents the next service function instance. The SFC path ID 720 is an unique identifier that presents a service chain path in the overlay virtual network indicated in an overlay header. The group of reserved bits 712, 722 is used for further extensions.

Aspects of this disclosure provide more detailed header formats for an explicit path list which may be used to correlate SFC path list information. FIG. 8 illustrates an embodiment SFC path list for the SFC header 700. As shown, the SFC path list 800 includes a number of hops 802, a group of reserved bits 804, an address family indication (AFI) 806, and a tenant system (e.g., service function) address list 808. The number of hops 802 presents a total number of addresses on the SFC path list 800. The group of reserved bits 804 may be used for further extensions. The AFI 806 is filled with an address of internet protocol version 4 (IPv4) or internet protocol version 6 (IPv6). In an embodiment, the value of AFI 806 may be different with a payload type of an overlay header. This indicates a service function address type may be differentiated from a type of payload which is treated by a service function. The tenant system address list 808 is a list of addresses representing a path hop order.

Figure 9:
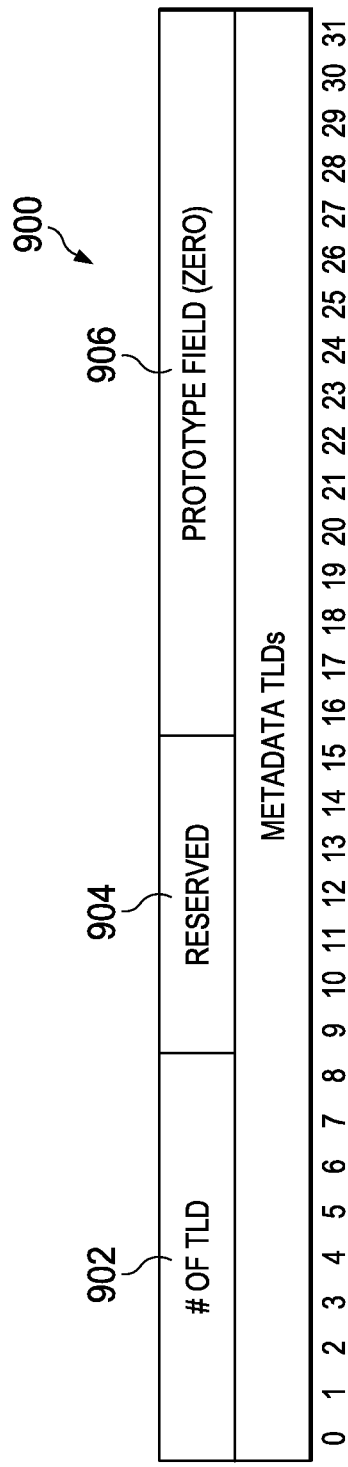
FIG. 9 illustrates an embodiment metadata for SFC header.

Aspects of this disclosure provide more detailed header format for metadata which may be used to correlate metadata information. FIG. 9 illustrates an embodiment optional metadata for the SFC header 700. As shown, the metadata 900 includes a number of type length data (TLD) 902, a group of reserved bits 904, a prototype 906, and metadata TLDs 908. The number of TLD 902 represents a total number of TLDs in the metadata 900. The group of reserved bits 904 may be used for further extension. The prototype 906 is set to zero and ignored in SFC header process. The metadata TLDs 908 are a set of metadata TLDs. A classifier node may once insert the metadata 900 on packets and allocate a different sequence numbers associated with the new metadata 900. This indicates a classifier node to change different metadata if necessary. In an embodiment, a service steering node may also apply the same metadata to the packets as well.

Figure 10:
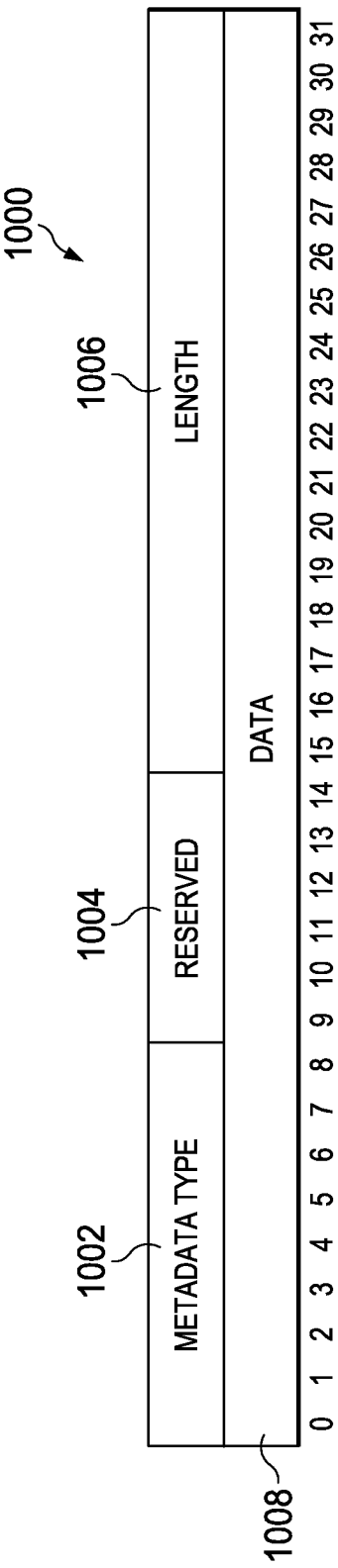
FIG. 10 illustrates an embodiment metadata type length data (TLD)

Aspects of this disclosure provide more detailed header format for a metadata TLD which may be embedded into the metadata. FIG. 10 illustrates an embodiment metadata TLD. As shown, the metadata TLD 1000 includes a metadata type 1002, a group of reserved bits 1004, a length 1006, and data 1008. The metadata type 1002 indicates a type of metadata embedded into the data 1008. The group of reserved bits 1004 may be used for further extension. The length 1006 represents a total number of bytes embedded into the data 1008 in a block of bytes.

Aspects of this disclosure provide various packet processing methods of a classifier node in a packet network when an SFC header is embedded into an overlay virtual network encapsulated frame. The classifier node has the responsibility to classify a traffic flow and steer the traffic flow to individual SFCs. The classifier node maintains an SFC path ID and information on the SFC header such as path list and metadata which may be manually provisioned or automatically configured at the classifier node. In an embodiment, the classifier node may have a network virtualization edge (NVE) capability, which is specified in NVE3 framework, in an overlay network environment, thereby receiving packets from a tenant system, encapsulating the packets, and then forwarding the packets to remote NVEs. In another embodiment, the classifier node may set an S bit in an overlay header during encapsulation processing as well as inserting an SFC header on the packets.

Figure 11:
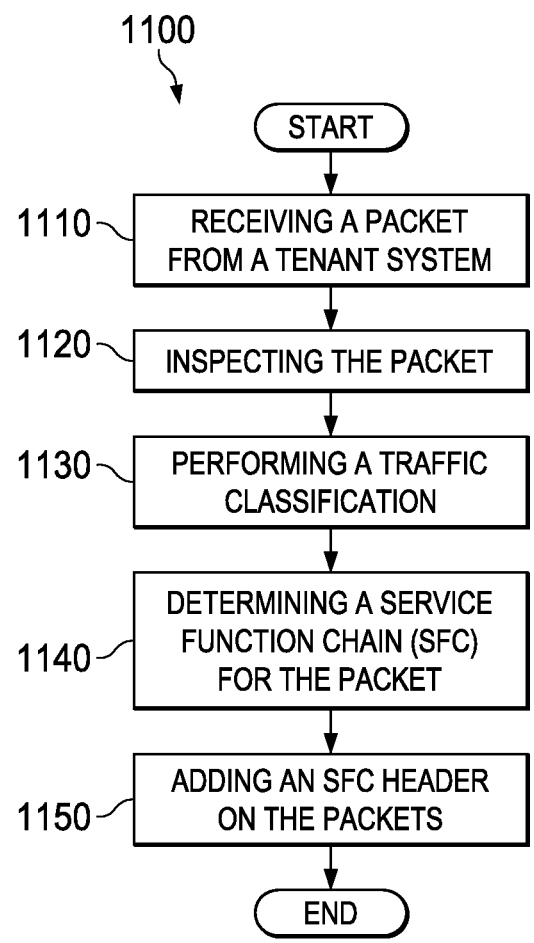
FIG. 11 illustrate a flow chart of an embodiment method for classifier node.

FIG. 11 illustrates an embodiment method 1100 for a packet processing at a classifier node. As shown, the method 1100 begins at step 1110, where the classifier node receives a packet from a tenant system. Next, the method 1100 proceeds to step 1120, where the classifier node inspects the packet to check whether the packet needs to be classified to the next service function chain. Subsequently, the method 1100 proceeds to step 1130, where the classifier node performs a traffic classification to assign the next destination for the packet received from the tenant system. Thereafter, the method 1100 proceeds to step 1140, where the classifier node defines an SFC which may be the next destination of the packet. Finally, the method 1100 proceeds to step 1150, where the classifier node adds the SFC header on the packet and fills the packet with proper information in the SFC header. These steps are generally carried out in sequence, however, under certain circumstances, there may be parallel aspects among the steps.

Aspects of this disclosure further provide various packet processing methods of a service steering node in a packet network when a SFC header is embedded into an overlay virtual network encapsulated frame. A service steering node may be implemented with an SFC stateless method that each packet carries complete SFC information in the SFC header. The service steering may contain one or more locally attached service function instances, receive some packets from an overlay network or an attached service instance, and determine the destination where the packets need to be transmitted with an SFC path list. The SFC path list may be carried by the packets or locally cached on the service steering node. In an embodiment, the service steering node may have an NVE capability, which is specified in NVO3 framework, in an overlay network environment, thereby receiving packets including an SFC header from an overlay network, decapsulating the received packets, and then processing the overlay header including an overlay network identifier and an S bit. In another embodiment, the service steering node may use an overlay network identifier to recognize all locally attached service function instances associated with the overlay network.

Figure 12:
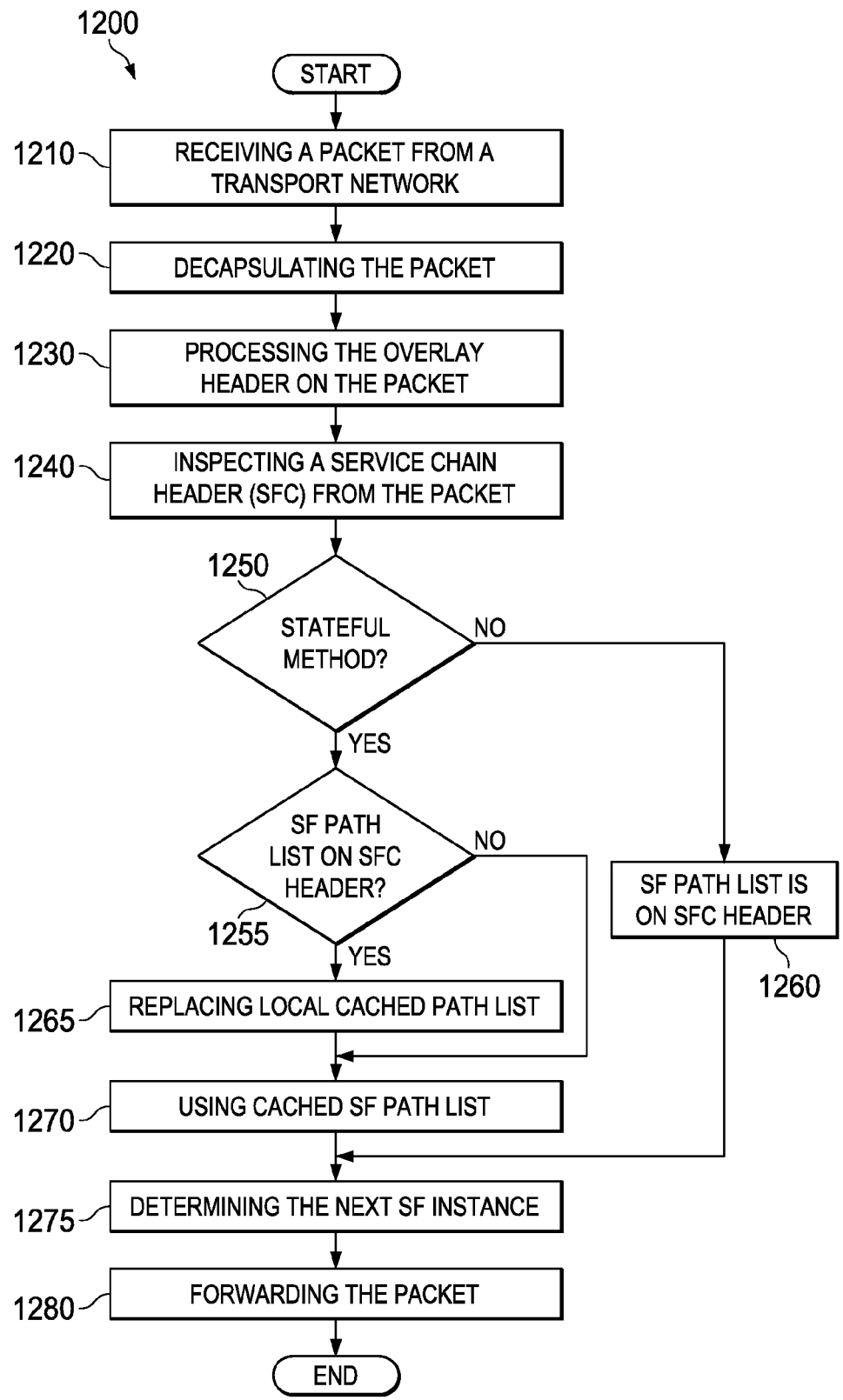
FIG. 12 illustrate a flow chart of an embodiment method for service steering node with a service node.

FIG. 12 illustrates an embodiment method 1200 for a packet processing at a service steering node with a service node (e.g., service steering node). As shown, the method 1200 begins at step 1210, where the service steering node receives a packet from an overlay network. Next, the method 1200 proceeds to step 1220, where the service steering node decapsulates the packet to handle and process. Next, the method 1200 proceeds to step 1230, where the service steering node processes the overlay header including an overlay network ID and an S bit set. The service steering node uses the overlay network ID to check all locally attached service function instances associated with the overlay network. Next, the method 1200 proceeds to step 1240, where the service steering node detaches the SFC header from the packet. Next, the method 1200 proceeds to step 1250, where the service steering node checks if a stateful method is supportable. If the stateful method (e.g., supporting stateless method) is not supported at the service steering node, the method 1200 proceeds to step 1260, where the service steering node relies on an SF path list on the SFC header. Subsequently, the method 1200 proceeds to step 1275, where the service steering node determines the next SF instance from the SF path list associated with the SFC path ID on the SFC header. Finally, the method 1200 proceeds to step 1280, where the service steering node forwards the packet (e.g., frame) including the SFC header and metadata to the next service function instance.

The method 1200 proceeds to step 1255, if the stateful method is supported at step 1255, where the service steering node checks if an SF path list exists on the SFC header. Subsequently, the method 1200 proceeds to step 1270, where the service steering node uses a cached SF path list associate with the SFC path ID on the SFC header. Finally, the method 1200 proceeds to step 1275, and then step 1280.

The method 1200 proceeds to step 1265, if an SF path list exists on the SFC header at step 1255, where the service steering node replaces a local cached path list with a path list on the SFC header. Subsequently, the method 1200 proceeds to step 1270. Finally, the method 1200 proceeds to step 1275, and then step 1280.

This provides capability for a classifier node to dynamically change the SF path list. These steps are generally carried out in sequence, however, under certain circumstances, there may be parallel aspects among the steps.

Figure 13:
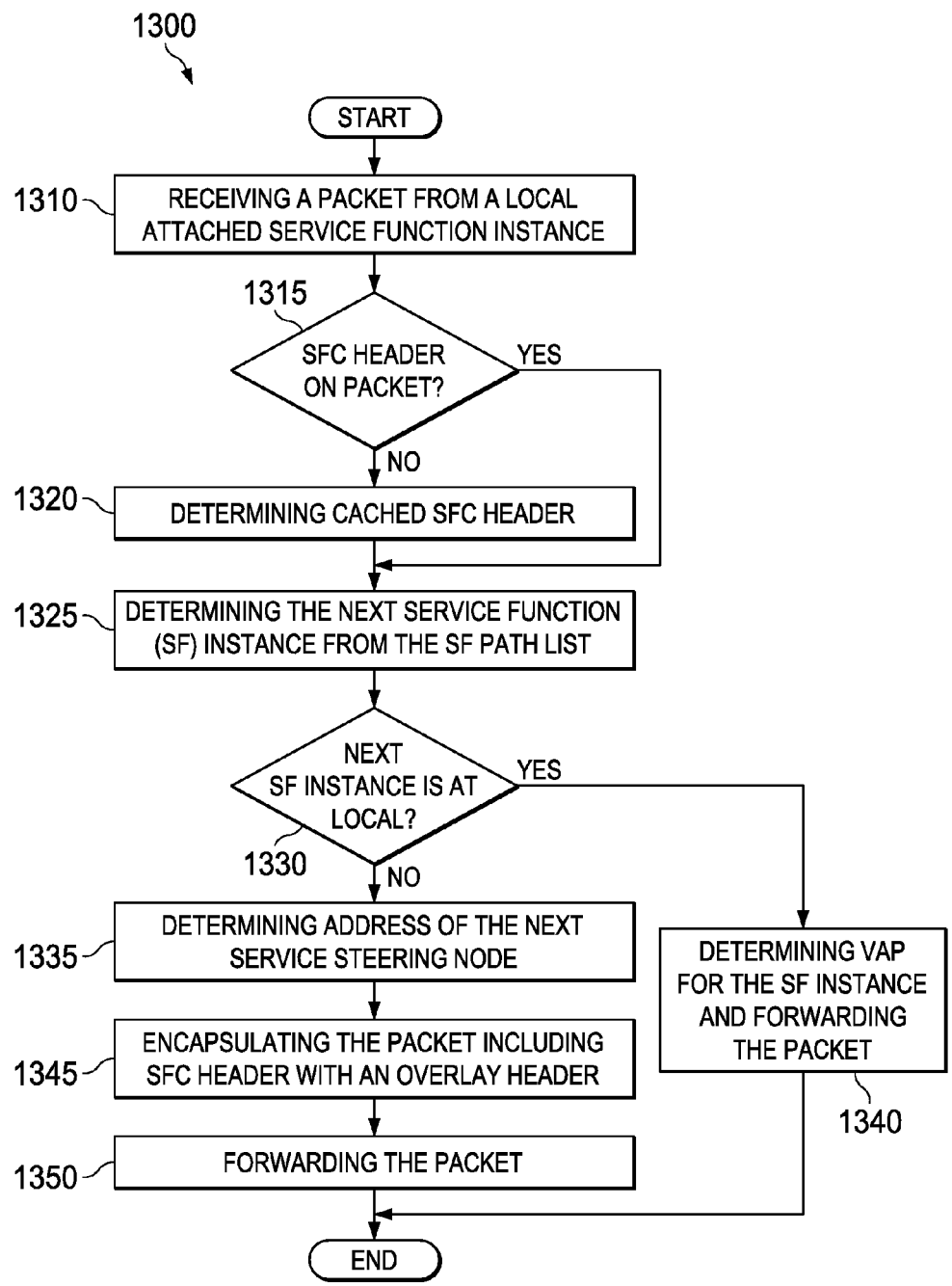
FIG. 13 illustrate a flow chart of an embodiment method for service steering node with a service function (SF) instance.

FIG. 13 illustrates an embodiment method 1300 for a packet processing at a service steering node with a service function instance. As shown, the method 1300 begins at step 1310, where the service steering node receives a packet from a local attached service function instance. Next, the method 1300 proceeds to step 1315, where the service steering node checks if an SFC header is included on the packet. If the SFC header is not included in the packet, the method 1300 proceeds to step 1320, where the service steering node determines cached SFC header. Next, the method 1300 proceeds to step 1325, where the service steering node determines the next SF instance from an SF path list associated with the SFC path ID on the SFC header. Next, the method 1300 proceeds to step 1330, where the service steering node checks if the next SF instance is a local SF instance. If the next SF instance is not a local SF instance at step 1330, the method 1300 proceeds to step 1335, where the service steering node determines an address of the next service steering node that is attached to the next SF instance. Subsequently, the method 1300 proceeds to step 1345, where the service steering node encapsulates the packet including the SFC header with an overlay header and inserts the next service steering node address as an outer address on the encapsulated packet. Finally, the method 1300 proceeds to step 1350, where the service steering node forwards the packet to the next service steering node.

The method 1300 proceeds to step 1325, if the SFC header is included in the packet at step 1315. Subsequently, the method proceeds to step 1340, if the next SF instance is a local SF instance at step 1330. Finally, the method 1300 proceeds to step 1340, where the service steering node determines VAP for the SF instance, and then forwards the packet to the next SF instance. These steps are generally carried out in sequence, however, under certain circumstances, there may be parallel aspects among the steps.

Aspects of this disclosure provide a local caching SFC information processing method of a service steering node in a packet network when a SFC header is embedded into an overlay virtual network encapsulated frame. If the service steering node locally caches SFC information, or SFC path/forwarding information and metadata information obtained from an SDN controller, the service steering node may retrieve the SFC information associated with an SFC path ID on the packets. The SFC information may include service function instances info, a virtual access point (VAP) of the service function instances, and the metadata information associated with the packets. Notably, the SFC may not include any metadata information.

A service steering node may check some flag bits on the SFC header. In an embodiment, if the service steering node already has locally cached SFC information for the SFC path ID on the packets not including a P bit set, the service steering node may include a PL Seq. bit. This indicates that the service steering node checks the PL Seq. matching and uses the SFC path list locally cached. In another embodiment, if the P bit flag in the SFC header including the SFC path ID is set and the SF path list is encoded on the packets, the service steering node refreshes the local cached path list and inserts a new explicit path list with a sequence number. In some embodiments, if the service function instance serves more than one SFCs and not able to accept the packet with SFC header, the service steering node may allocate a VAP for each SFC. This indicates the service steering node may identify the specific SFC associated with the packets from the service function instance. In an embodiment, an SF may accept an SFC header in order for a service steering node to directly pass the packet with the SFC header to the SF.

Aspects of this disclosure provide a local non-caching SFC information processing method of a service steering node in a packet network when an SFC header is embedded into an overlay virtual network encapsulated frame. If the service steering node does not cache SFC information, the service steering node uses the SFC header including an SFC path ID and all SFC information carried by the packets for the service steering node and service function instances. The top entry of an SFC path list in the SFC header may be encoded to the next service function instance address. The service steering node performs a table lookup to find a VAP associated with the service function instance address and removes the list from the SFC path list, and then temporarily stores the removed SFC path list.

Figure 14:
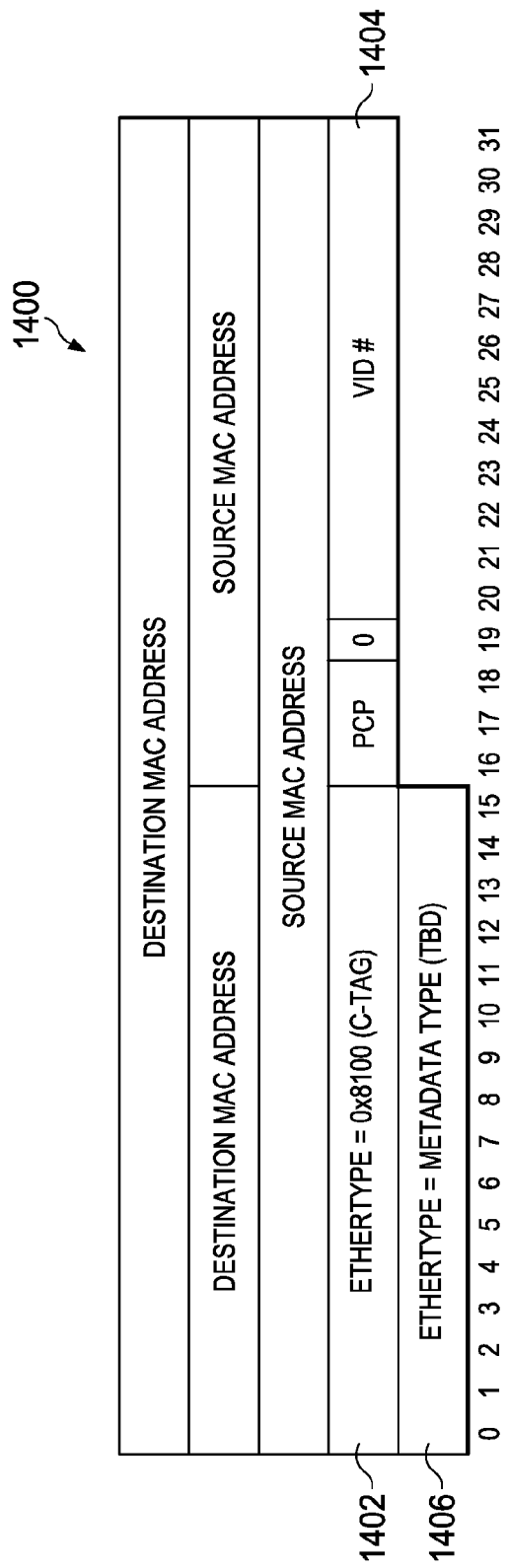
FIG. 14 illustrates an embodiment Ethernet header.

Aspects of this disclosure provide a packet sending method of a service steering node to a service function instance in a packet network when an SFC header is embedded into an overlay virtual network encapsulated frame. A service steering node may insert corresponding virtual local area network identification (VLAN ID) and metadata encoded by metadata type in an ethertype. The ethertype may be newly allocated by the internet assigned number authority (IANA). FIG. 14 illustrates an embodiment tenant Ethernet header with metadata. As shown, the Ethernet header 1400 includes conventional header components (e.g., destination medium access control (MAC) address, source MAC address and priority code point (PCP)), an ethertype 1402, a VLAN ID 1404, and metadata 1406. The ethertype 1402 is set to 0x8100 to identify the following metadata 1406 as a VLAN tag. The VLAN ID 1404 is set to the specific ID for the metadata 1406 associated with a service function instance in the VLAN ID 1404.

Figure 15:
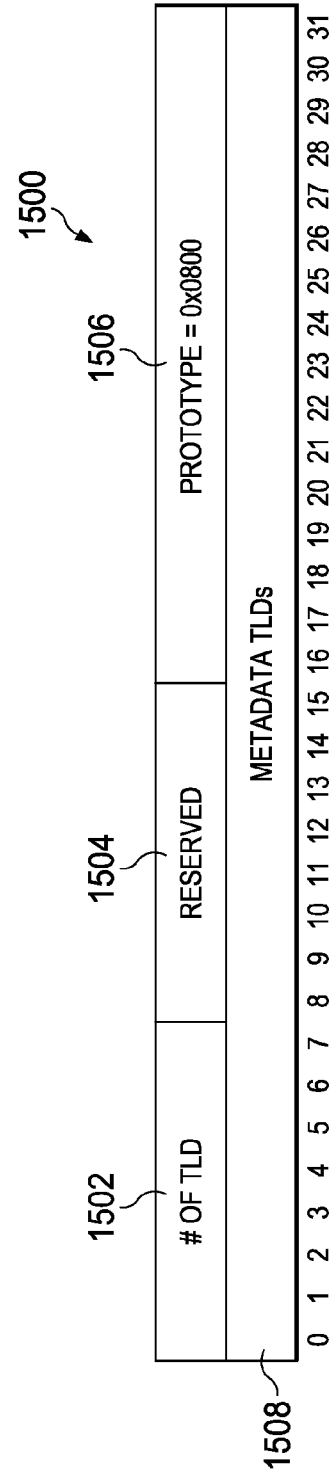
FIG. 15 illustrates an embodiment metadata for Ethernet header.

Aspects of this disclosure provide more detailed format for metadata which is embedded into the metadata type length data (TLD). FIG. 15 illustrates an embodiment metadata for Ethernet header. As shown, the metadata 1500 includes a number of TLD 1502, a group of reserved bits 1504, a prototype 1506, and metadata TLDs 1508. The number of TLD 1502 presents the number of metadata TLDs 1508 associated with the metadata 1500. The group of reserved bits 1504 may be used for further extension. The protocol type 1506 may be filled with ethertype value of the payload type such as IPv4 or IPv6 payload.

Aspects of this disclosure provide a sending and receiving method of an overlay virtual network encapsulated frame between a service steering node and a service function instance when an SFC header is embedded into an overlay virtual network encapsulated frame. A service steering node and a service function instance may confirm with each other that they provide a capability to support Ethernet frame with encoded metadata in order to pass packets with metadata. When the service function instance receives the packets, the service function instance treats the packets with or without metadata, where the service function instance may be a physical device or a virtualized function on a virtual machine (VM). This indicates that the service function instance caches the packets and applies the packet treatment for a set of the packets received. After finishing the packet treatment, the service function instance transmits the packets back to the service steering node. If the metadata is included, the service function instance inserts the metadata on the packets prior to sending the packets to the service steering node. In an embodiment, the service function instance may modify the received metadata to send the packets back to the service steering node. This also indicates that conventional addresses (e.g., MAC or IP) for VAP address may be regionally decided by between the service function instance and the service steering node.

In an embodiment, a service steering node retrieves an SFC path ID for the packets returning back from a SF based on a C-VLAN ID. In another embodiment, a service steering node receives the packets with an SFC header from an SF. When the service steering node receives packets from a service function instance, if the top entry on the SF path list points out another service function instance attached, the service steering node may forward the packets to the service function instance. If the top entry on the SFC path list points out another service function instance which resides on another service steering node, the SFC header back on the packet may be added. Otherwise, TTL and path list on the SFC header may be updated, and then forwarded to that service steering node. In an embodiment, when a last service steering node in the SFC receives packets with the SFC header from an overlay network, the last service steering node may generally perform the same process respecting to sending packets to the overlay network. Accordingly, the service steering node checks an SF path list and performs a table lookup against the destination address on the packets where no entry on the explicit path list is left. If the destination address is one of local addresses, the service steering node forwards the frame to a tenant system directly. The service steering node inserts an overlay header with an S bit clear and outer headers on the packets, and sends the packets to a remote NVE.

In some embodiments, the special notification may be used for a service steering node to indicate the service function path specified in the service chain information packets before arriving of actual user packets. This indicates that the service steering node successfully set up a steering policy and may reach the service functions or service function instances. If the service functions or instances for the specified traffic flows are changed, a new service chain identifier may be used. If the service functions or instances for the specified traffic flows are not changed, the service steering nodes may have stale service function paths for the specified traffic flow.

A service classifier node may create a packet that only contains SFC information, which is a special packet. The service chain information packet may include a service chain path ID, a service function path, metadata, and flag bits to facilitate the operation processes. In an embodiment, the service classifier node may send the service chain information packet using an out-band signaling method to each service steering nodes. The service chain information packets carry the detailed service chain path ID and the service function path, the remaining packets of a traffic flow only carry the service chain path ID and potential metadata.

In an embodiment, the indication from the service classification node may be sent to the service steering node for checking validation of the service function path associated with the certain service chain path ID. If any changes to the service function path for the specific service chain ID are required, the service steering node disassociate the previous service function path associated with the previous service chain path ID.

Aspects of this disclosure provide a service chain branching method of a traffic flow in a packet network when a SFC header is embedded into an overlay virtual network encapsulated frame. A service function may directly send a special message to service classification nodes, an SDN controller, or a service steering node in order to request a service chain branching for a traffic flow being served.

Figure 16:
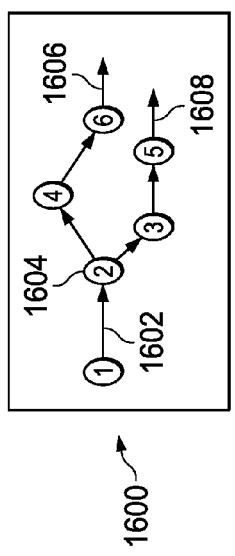
FIG. 16 illustrates an embodiment service chain branching.

FIG. 16 illustrates an embodiment service chain branching. As shown, the service chain branching 1600 includes an ingress traffic flow 1602, a branching network node 1604 (e.g., traffic classifier node, service steering node), and branched traffic flows 1606, 1608. The network node 1604 splits the ingress traffic flow 1602 into two service chain paths 1606, 1608 when the network node 1604 receives the special message from a service function.

Figure 17:
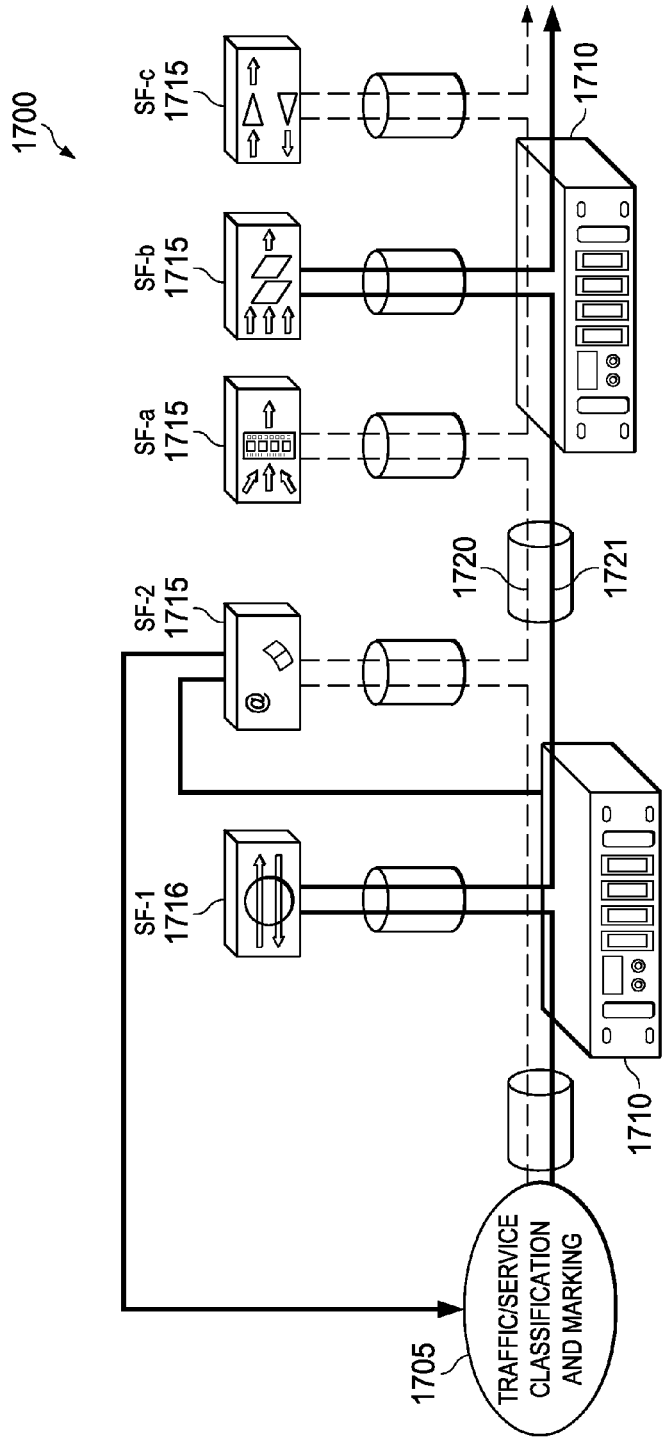
FIG. 17 illustrates an embodiment service chain branching indication message option.

FIG. 17 further illustrates an embodiment service chain branching indication message option. As shown, the service chain branching indication message option 1700 includes a network node (e.g., traffic classification and service chain marking) 1705, service steering nodes 1710, service functions 1715, 1716, and service chain paths 1720, 1721. The service function 1715 sends a special message to the network node 1705 to request a re-classification of the traffic flow when a traffic branching criterion is satisfied. The traffic classifier 1705 branches the service chain path to the next service chain path when the traffic classifier 1705 receives the special message from the service function 1715. This may be achieved by branching the traffic flow from the first service chain path 1720 to the second service chain path 1721.

In an embodiment, the service function 1715 sends a special message to the service steering node 1710 to request a re-classification of the traffic flow when a traffic branching criterion is satisfied. The service steering node 1710 inserts a new service ID and re-routes a service chain path to the next service chain path when the service steering node 1710 receives the special message from the service function 1715. This may be achieved by branching the traffic flow from the first service chain path 1720 to the second service chain path 1621.

Aspects of this disclosure allow for an SFC implementation in a packet network. This indicates network nodes to offer distributed service functions and leverage overlay tunnel mechanism using a new SFC header and its associated packet traffic handling mechanisms that network nodes enable traffic flows passing a set of ordered service functions. This also results in improved quality of service and flexible network traffic handling under various network environments in a packet network.

Figure 18:
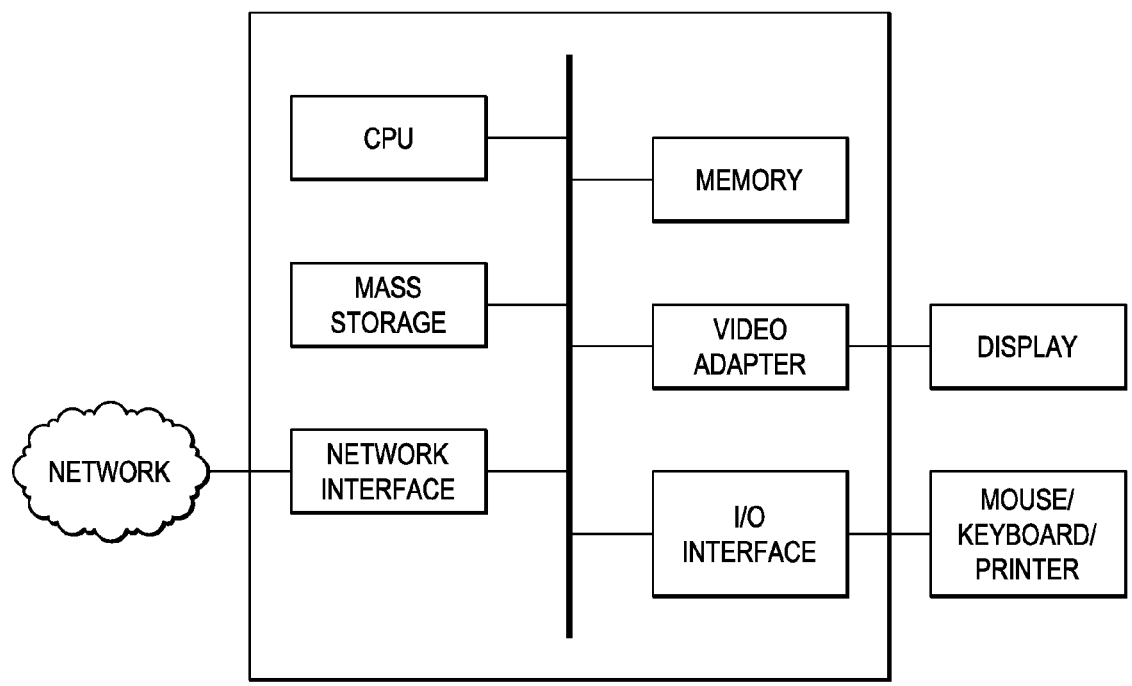
FIG. 18 illustrates a computing platform that may be used for implementing, for example, the devices and methods described herein, in accordance with an embodiment.

FIG. 18 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may include a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may include any type of electronic data processor. The memory may include any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may include any type of non-transitory storage device configured to store data, programs, and other information and to make the data, programs, and other information accessible via the bus. The mass storage device may include, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may include wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for service function chaining, the method comprising:
   receiving, by a service steering node, an incoming overlay virtual network encapsulated frame, wherein the service steering node is in a service function chain (SFC) with service function instances, wherein the incoming overlay virtual network encapsulated frame comprises an overlay header with an S bit, wherein the S bit is set to indicate that an SFC header is embedded after the overlay header in the incoming overlay virtual network encapsulated frame, and wherein the SFC header comprises an SFC path identifier (ID) identifying the SFC;
   determining, by the service steering node, a service function instance in the SFC for the incoming overlay virtual network encapsulated frame, wherein the service function instance is either on the service steering node or on a next network node of the SFC, in accordance with the SFC path ID of the SFC header in the incoming overlay virtual network encapsulated frame; and
   forwarding, by the service steering node along the SFC, an outgoing overlay virtual network encapsulated frame including the SFC header to the service function instance.

2. The method of claim 1, further comprising:
   receiving a second incoming overlay virtual network encapsulated frame from an overlay network, wherein the second incoming overlay virtual network encapsulated frame comprises a second SFC header;

decapsulating the second incoming overlay virtual network encapsulated frame to produce a tenant system frame and the second SFC header; and inspecting the second SFC header including a second SFC Path ID and SFC Path ID associated information.

3. The method of claim 2, further comprising:

refreshing a locally cached path list with a new path list in the second SFC header.

4. The method of claim 2, further comprising:

inspecting an SFC path list that is locally cached or on the second SFC header according to the second SFC path ID;

identifying a second service function instance and a virtual access point (VAP) of the second service function instance according to the SFC path list and locally configured information; and sending, by the service steering node, a second frame to the second service function instance with a corresponding identifier for the second frame.

5. The method of claim 4, wherein the second frame does not include the second SFC header and wherein the second frame includes encoded metadata, and wherein a protocol type indicates a type of the encoded metadata.

6. The method of claim 4, wherein the second frame does not include the second SFC header.

7. The method of claim 4, wherein the second frame includes the second SFC header.

8. The method of claim 1, further comprising:

receiving, by the service steering node, a second frame from a second service function instance in the SFC;

obtaining an SFC path ID and an SFC path list from an SFC header of the second frame; and forwarding, by the service steering node, the second frame to a next service function instance, wherein a top entry of the SFC path list indicates the next service function instance.

9. The method of claim 8, wherein the service steering node is a last service steering node in the SFC.

10. The method of claim 1, further comprising transmitting, by the service steering node, a special notification indicating that the service steering node has successfully set up a steering policy.

11. A service steering node comprising:

a processor; and a non-transitory computer readable storage medium storing programming for execution by the processor, the programming including instructions for:

receiving an incoming overlay virtual network encapsulated frame, wherein the service steering node is in a service function chain (SFC) with service function instances in the SFC, wherein the incoming overlay virtual network encapsulated frame comprises an overlay header with an S bit, wherein the S bit is set to indicate that an SFC header is embedded after the overlay header in the incoming overlay virtual network encapsulated frame and wherein the SFC header comprises an SFC path identifier (ID) identifying the SFC;

determining a service function instance in the SFC for the incoming overlay virtual network encapsulated frame, wherein the service function instance is either on the service steering node or on a next network node of the SFC in accordance with the SFC path ID of the SFC header in the incoming overlay virtual network encapsulated frame; and forwarding, along the SFC, an outgoing overlay virtual network encapsulated frame including the SFC header to the service function instance.

12. The service steering node of claim 11, wherein the instructions further comprise instructions for:

receiving a second incoming overlay virtual network encapsulated frame from an overlay network, wherein the second incoming overlay virtual network encapsulated frame comprises a second SFC header;

decapsulating the second incoming overlay virtual network encapsulated frame to produce a tenant system frame and the second SFC header; and inspecting the second SFC header including a second SFC Path ID and SFC Path ID associated information.

13. The service steering node of claim 12, wherein the instructions further comprise instructions for:

refreshing a locally cached path list with a new path list in the second SFC header.

14. The service steering node of claim 12, wherein the instructions further comprise instructions for:

inspecting an SFC path list that is locally cached or on the second SFC header according to the second SFC path ID;

identifying a second service function instance and a virtual access point (VAP) of the second service function instance according to the SFC path list and local configured information; and sending a second frame to the second service function instance with a corresponding identifier for the second frame.

15. The service steering node of claim 14, wherein the second frame does not include the second SFC header and wherein the second frame includes encoded metadata, and wherein a protocol type indicates a type of the encoded metadata.

16. The service steering node of claim 14, wherein the second frame does not include the second SFC header.

17. The service steering node of claim 14, wherein the second frame includes the second SFC header.

18. The service steering node of claim 14, wherein the instructions further comprise instructions for transmitting a special notification indicating that the service steering node has successfully set up a steering policy.

19. The service steering node of claim 11, wherein the instructions further comprise instructions for:

receiving a second frame from a second service function instance on the SFC;

obtaining an SFC path ID and an SFC path list from an SFC header of the second frame; and forwarding the second frame to a next service function instance, wherein a top entry of the SFC path list indicates the next service function instance.

* * * * *